J G. BROWN.
STONE SCREENINGS DISTRIBUTER.
APPLICATION FILED OCT. 2, 1914.
1,182,747.
Patented May 9, 1916.
2 SHEETS—SHEET 2
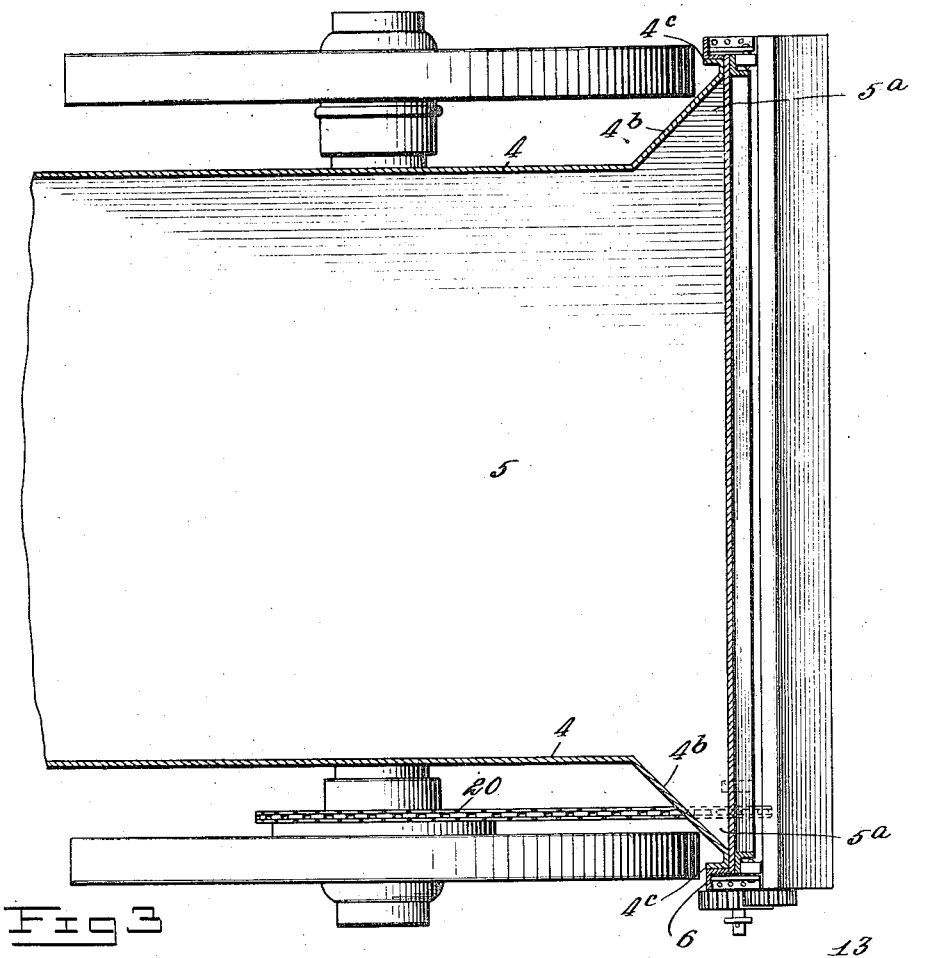
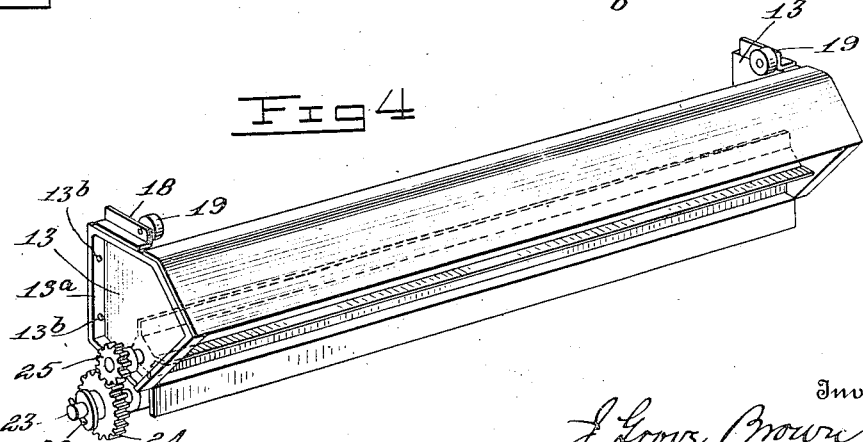

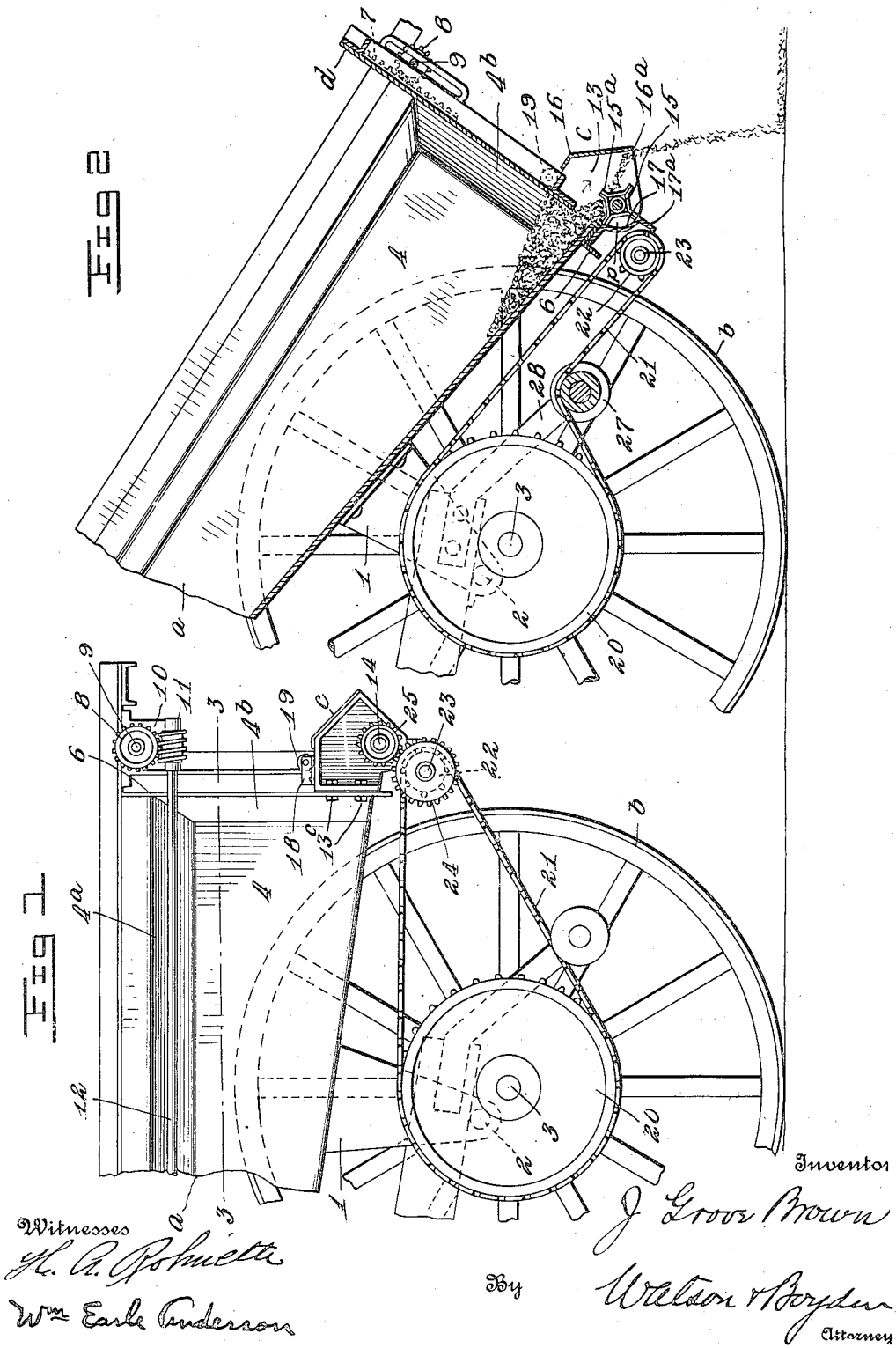

UNITED STATES PATENT OFFICE.

J GROVE BROWN, OF GROTON, NEW YORK.

STONE-SCREENINGS DISTRIBUTER.

1,182,747.   Specification of Letters Patent.   Patented May 9, 1916.

Application filed October 2, 1914. Serial No. 864,618.

*To all whom it may concern:*

Be it known that I, J GROVE BROWN, a citizen of the United States, residing at Groton, in the county of Tompkins and State of New York, have invented certain new and useful Improvements in Stone-Screenings Distributers, of which the following is a specification.

This invention relates to improvements in mechanism for distributing fine road-making material, such as stone screenings, gravel, etc., upon roadways, and it comprises an endwise dumping vehicle, useful for general purposes, but having the body portion especially designed for the delivery of material into distributing attachments, and for the convenient connection of such attachments, together with an attachment adapted to be applied to said body and including a distributing roller, driven by the vehicle, for throwing the material against a baffle plate from whence the material drops down in a thin stream upon the roadway.

In the accompanying drawing, which illustrates my invention, Figure 1 is a side elevation, with one of the wheels removed, of the rear portion of an endwise dumping vehicle having my improvements thereon; Fig. 2 is a similar view, the wagon body and attachments thereon being shown in central section, the wagon body being in dumping position; Fig. 3 is a section on the line 3—3 of Fig. 1; and Fig. 4 is a rear perspective view of the distributing attachment.

Referring to the drawing, $a$ indicates the vehicle body, and $b$ the rear wheels. The body is suitably mounted to dump rearwardly upon legs 1, pivoted at 2 near the rear axle 3. The sides 4 of the body flare outwardly and upwardly over the wheels, as indicated at 4$^a$, and the rear ends of the sides flare outwardly, as indicated at 4$^b$, (Fig. 3) and are then turned forwardly in the planes of the wheels, as indicated at 4$^c$. The rear end of the bottom 5 also flares outwardly, as indicated at 5$^a$, the purpose of this flaring end of the body being to cause the material to spread outwardly in a stream of greater width than the major portion of the body as it leaves the vehicle and enters the distributing casing $c$. An angle bar 6 is secured at the sides of the vehicle and passes downwardly along the forwardly turned parts 4$^c$ and beneath the floor of the vehicle, strengthening the flaring end thereof, and also affording a convenient stop and attaching means for positioning and securing detachable distributers, chutes, etc., to the vehicle body. At the end of the vehicle body is arranged a sliding and swinging gate $d$, having at its opposite edges vertical rack bars 7 (one of which is shown in Fig. 2) engaged by spur gears or pinions 8; which are secured to a shaft 9 journaled in suitable bearings at the end of the body. This shaft is fitted with a worm gear 10 which is engaged by a worm 11, mounted upon an operating shaft 12 extending toward the front of the vehicle. It will be evident that by the operation of the shaft 12, the end gate may be raised or lowered; also that the gate may swing about the shaft 9 as an axis unless the lower end of the gate is restrained against this swinging movement. The vehicle as thus far described is suitable for general purposes, without further attachments, and may be used for hauling and dumping loads of material in piles or un-even layers, although the body and end gate are designed more especially for interchangeable attachments for spreading the material in even layers upon the roadway.

The distributing casing $c$, shown in the drawing, comprises two similar ends or heads 13, having flanges 13$^a$ provided with bolt holes 13$^b$ through which bolts 13$^c$ (Fig. 1) may be passed to secure the heads to the vertical portions of the angle bar 6 on the body. These heads, when in position, project rearwardly beyond the end gate. Journaled in the heads is a shaft 14 carrying a vaned distributing roller 15, the roller being positioned so that its vanes pass close to the rear edge of the bottom of the vehicle body. As shown in the drawing, there are four vanes 15$^a$ upon the roller. The casing comprises an upper wall 16, secured to the heads 13 at the rear of the end gate and extending downwardly and rearwardly therefrom, forming a baffle plate, and a lower wall 17, also secured to said heads, this lower wall extending downwardly concentrically with the axis of the distributing roller through an arc of approximately ninety degrees from the rear end of the bottom of the wagon, and having a guard 17$^a$ projecting downwardly from the lower edge of its curved portion. The bottom of the casing is open between the guard 17ᵃ and the lower edge 16ᵃ of the wall 16, which latter wall forms a deflector for the material as it is thrown from the roller. Upon the heads of the casing are mounted brackets 18, to which are attached rollers 19, which, when the attachment is upon the vehicle, serve as guides for the gate in the vertical movements of the latter, and also restrain the swinging movement of the gate.

The distributing roller is operated by means of a sprocket wheel 20, attached to the hub of one of the vehicle wheels, a sprocket chain 21 connecting said sprocket wheel with a smaller sprocket wheel 22, upon a shaft 23 which is journaled in bearings in one of the heads 13. This shaft carries a gear 24, meshing with a gear 25 on the roller shaft 14. By means of a suitable clutch 26, (Fig. 4) the details of which are not shown, the gear 24 may be connected to or disengaged from the shaft 23 when desired in order that the distributing roller may be operated in dumping the load and stopped at other times. An idle roller 27, upon a bracket 28, is suitably positioned for keeping the sprocket chain or belt 21 taut in all positions of the wagon body.

In operation, when the vehicle is used for distributing gravel and fine stone screenings, the screenings distributer attachment is applied to the vehicle body by fitting the heads of the attachment to the angle bar 6 and bolting it thereto, and in this position of the distributer casing, the rollers 19 thereon restrain the end gate against swinging motion, but permit the gate to slide vertically. The gate may be adjusted vertically to vary the flow of material into the distributer casing, and when the wagon body is tilted and the wagon moved forward, the material will flow into the casing and the distributing roller will be rapidly revolved, the vanes of the roller causing the material to be thrown against the rear wall or deflector plate 16, from whence it will drop downwardly on to the road. The arrangement of the distributing roller with reference to the opening between the gate and the floor of the body is such that if the wagon stops while the gate is open, the roller, then stationary, will check the flow of material and prevent it from being discharged on to the roadway. It is desirable, while the roller is in operation, to fill the pockets formed between consecutive vanes as they approach and pass the outlet opening between the gate and the floor of the body, in order that the material may be delivered on the roadway in an even layer, and it is also desirable to prevent any of the material which passes over the top of the roller from being carried around by the vanes as might occur at slow speeds with some classes of material. For these purposes, the curved portion of the end wall 17 of the casing is made short, from top to bottom, so as to give the material ample time to drop off of the roller before the vanes commence their upward movement. The length of this curved portion should not, however, be less than the distance between two vanes, as the material commences to flow down into the pocket p between consecutive vanes, to fill the pocket, as soon as one vane leaves the upper end of the curved portion of the part 17 of the casing, and if this part were much shorter than the distance between the vanes, there would be a continual leakage of material past the rear side of the roller.

The wagon body, with its flaring end and sliding and swinging gate, as stated, is useful for general purposes, but is particularly designed for use in connection with various forms of distributing attachments of my invention, in some of which the gate is given a sliding movement only, and in others, a swinging and sliding movement. For the purpose of the present invention, the sliding movement only is desired and by providing the guide rollers upon the casing of the distributing attachment, the placing of the attachment in position against the angle bar 6 also locates the rollers in position to act as guide rollers for the gate.

What I claim is:

1. In a mechanism for distributing screenings, etc., on roadways, an endwise dumping vehicle and an end-gate attached thereto and movable vertically, a casing having heads attached to the sides of the vehicle and having upper and lower walls extending between said heads, the upper wall extending rearwardly and downwardly from the gate and forming a baffle, and a vaned roller journaled in said heads and extending parallel with the rear end of the vehicle bottom and immediately at the rear of and below the same.

2. In a machanism for distributing screenings, etc., on roadways, an endwise dumping vehicle, a sliding and swinging gate connected to the rear end thereof, a distributer casing comprising end-pieces, detachably connected to the sides of the vehicle and projecting rearwardly therefrom, upper and lower walls extending between said end-pieces, the upper wall being at the rear of the gate, a distributing roller in said casing, and means on the casing for guiding the gate in its sliding movement and restraining its swinging movement.

3. In a mechanism for distributing screenings, etc., on roadways, an endwise dumping vehicle, a gate connected to the rear end thereof, a distributer casing comprising end-pieces, detachably connected to the sides of the vehicle and projecting rearwardly therefrom, a distributing roller, having radial vanes, journaled in said heads, upper and lower walls extending between said end-pieces, the upper wall being at the rear of the gate and extending downwardly and rearwardly therefrom, and the lower wall curving downwardly and rearwardly concentrically with the axis of the roller from the bottom of the vehicle for a distance approximately equal to the distance between successive vanes on the roller.

4. In a mechanism for distributing screenings, etc., on roadways, an endwise dumping vehicle having a vertically movable end gate, the body of the vehicle having its sides diverging at their rear ends and then turned forwardly, an angle bar extending vertically on said forwardly turned parts and beneath the bottom of the vehicle, and a screenings distributer comprising a casing having heads detachably secured to the angle bar, upper and lower walls connected to the end-pieces, and a distributing roller between the walls.

5. In a mechanism for distributing screenings, etc., upon roadways, a dumping vehicle having at its outlet a sliding gate, a vaned distributing roller journaled in suitable bearings at the rear of the bottom, a short curved wall extending downwardly, concentric with the axis of the roller and close to the vanes thereof, from the end of the bottom, said wall terminating below the roller, and means for rotating the roller so that its vanes move upwardly adjacent said wall.

In testimony whereof I have affixed my signature, in presence of two witnesses.

J GROVE BROWN.

Witnesses:
   FRED. C. ATWATER,
   WILLIAM H. ROBINSON.